Feb. 2, 1971   J. D. VICKERY   3,559,303
PLANET SEQUENCE PROJECTOR
Filed Jan. 3, 1969   2 Sheets-Sheet 1

INVENTOR.
James D. Vickery
BY
Richard D. Low
ATTORNEY

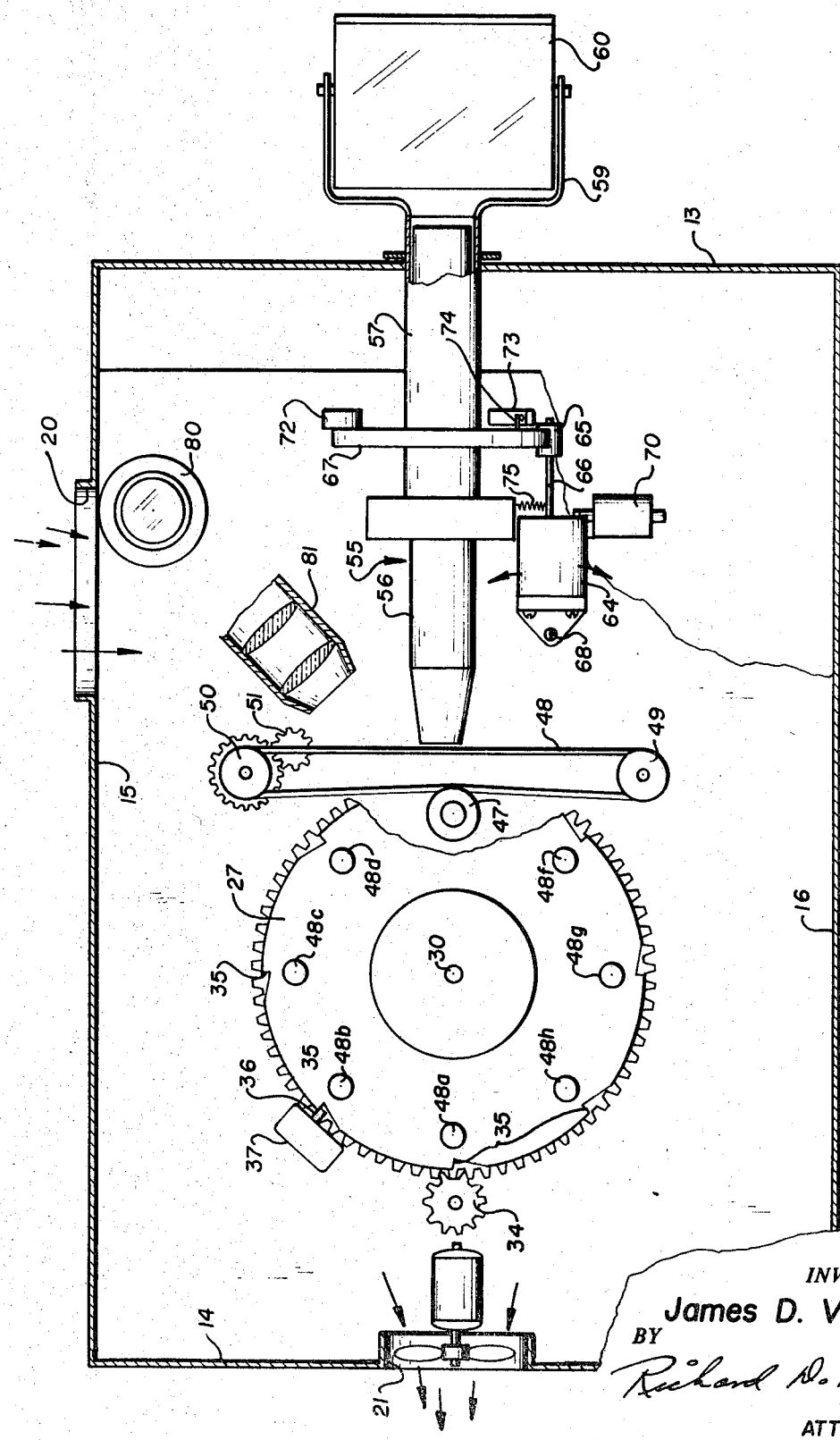

United States Patent Office 3,559,303
Patented Feb. 2, 1971

3,559,303
PLANET SEQUENCE PROJECTOR
James D. Vickery, 670 Garland St.,
Lakewood, Colo. 80215
Filed Jan. 3, 1969, Ser. No. 788,906
Int. Cl. G09b 27/00
U.S. Cl. 35—42.5             10 Claims

ABSTRACT OF THE DISCLOSURE

A planetarium projector sequentially produces an individual image of each of the major planets of the solar system, each image depicting a planet spinning on its axis and moving across the dome of the planetarium. The projector system includes a turntable having a series of scale models mounted on rotatable shafts mounted on the table, and the table is arranged to sequentially index each of the models into a position in front of the projection lens system and into light path for projecting an opaque projection onto a pivoted mirror which moves the image across the planetarium dome.

---

A visual display of astronomical phenomina is usually provided in a planetarium, which is a building having a hemispherical dome and an orrery, a devce for projecting a plurality of spots of light on the dome in the size and general location of particular stellar and planetary representation, for example, stars, galaxies, planets, etc. Movement and rotation of the orrery causes the spots of light to move on the dome in any desired path. For a complete program in a planetarium, various other types of projectors may be used for producing images on the planetarium dome, such projectors normally being called auxiliary projectors. Generally, the image produced by such auxiliary projectors is of that type produced by passing light through a transparency, which produces an image of the subject on the transparency on the dome.

According to the present invention, I have provided an opaque projection of solid models of planets, and the like, spinning on their axis, providing a very realistic planetary image on the dome of the planetarium. The projector is arranged for the individual showing of the planets, astroids or man-made satellites as desired, with axial rotary motion of the object and transitory movement of the image across the planetarium dome. The projector includes a rotary table having spacedly mounting rotary shafts with the models mounted thereon, and these models may be individually indexed to a position in front of a projection lens system by remote control, for the sequential showing of the image of these models on the planetarium dome. The projector is provided with a mirror that moves a projected image from the horizon line of the planetarium dome to a point beyond about the zenith, with means for repositioning the mirror for the showing of the next succeeding image.

Included among the objects and advantages of the present invention is a three-dimensional planet sequence projector, which is arranged to produce a rotating opaque image on the dome of a planetarium.

Another object of the invention is to provide a projector arranged for sequentially projecting the image of a plurality of objects mounted on a turntable in the projector, with means for indexing the individual objects into a projection position in front of a projection lens system.

A further object of the invention is to provide an opaque prjector for producing an image on the dome of a planetarium with the representation in the image rotating about an axis.

These and other objects and advantages of the invention may be readily ascertained by referring to the following description and appended illustration in which:

FIG. 3 is a top plan view of a projector according to the invention taken along section lines 3—3 of the device of FIG. 1.

Figures 1, 2:
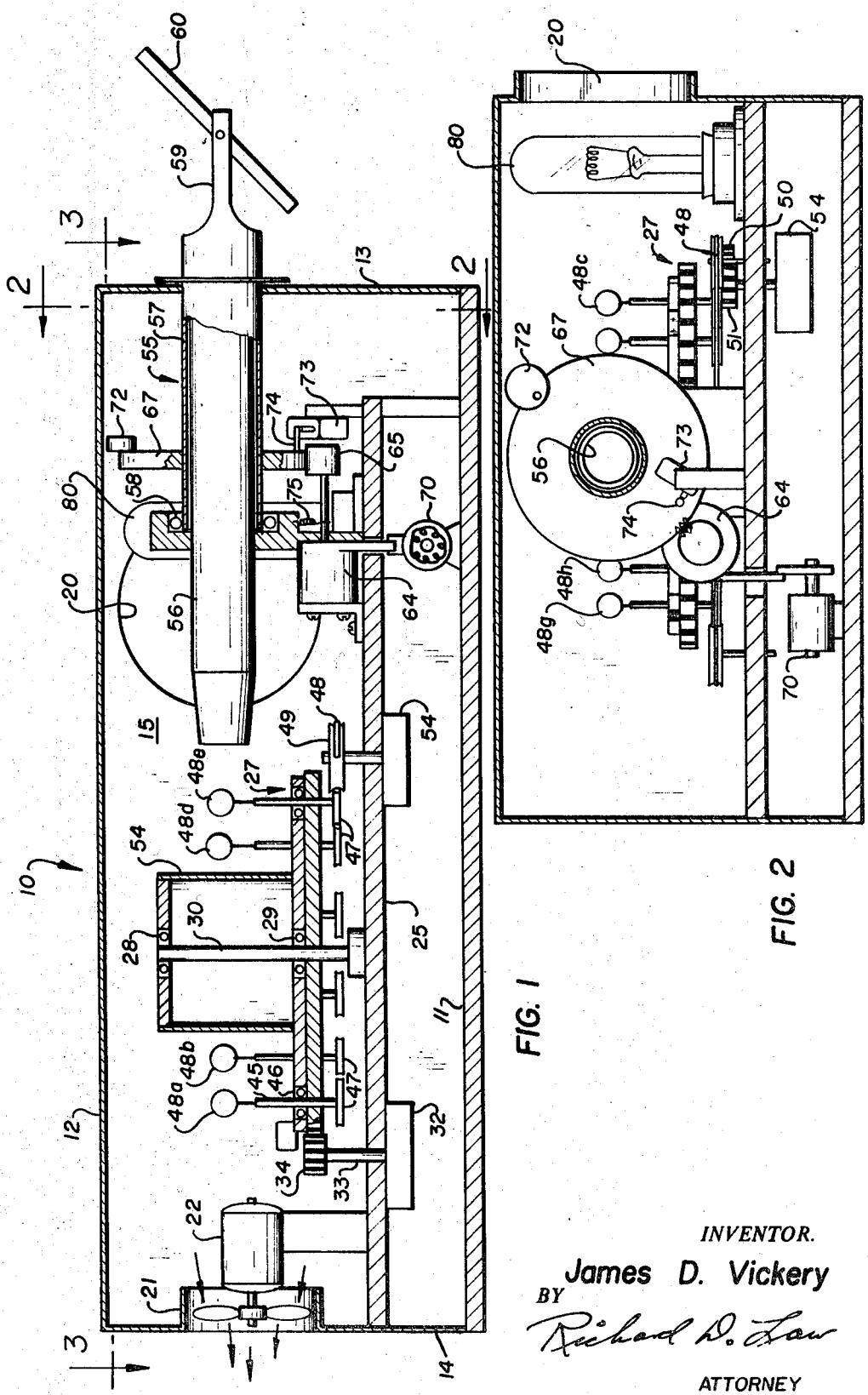
FIG. 1 is a side elevational view, partially in section, of a three-dimensional sequence projector according to the invention.
FIG. 2 is an end elevational view of the device of FIG. 1 taken along section lines 2—2.

In general, the device of the invention provides a turntable arranged periodically to move a portion of a turn, indexing an object or model, mounted on a rotary shaft, in front of a projection lens system and a light beam to provide sufficient illumination for projection of the image. Incorporated with the lens system is a mirror which is arranged to move the image in a transitory motion from the horizon of the planetarium dome to a point past zenith. The projector is arranged so that the only model rotating is the one directly in front of the projection lens system, and as additional models are indexed to the position in front of the projection lens system by the operator they start rotating. Further, the transitory movement to the image is controlled by a motor rotating the mirror, and it is re-indexed to start position by a remote control from the operator's booth.

In the device selected for illustration, a generally light-proof box shown in general by numeral 10, includes a bottom 11, a top 12, ends 13 and 14 and sides 15 and 16. An air inlet 20 and an exhaust outlet 21 having a motor and exhaust fan 22 therein provides ventilation for the unit. As the projector is to be used in a darkened room, the inside of the projector is preferably painted a flat black, as well as the outside to prevent as much as possible stray light in the darkened room.

Attached to the bottom 11 of the box is a platform 25, on which is mounted a rotary turntable shown generally by numeral 27. Supported on bearings 28 and 29 is an upright shaft 30. An electric motor 32, mounted below the platform 25, is provided with a shaft 33 extending upwardly through the platform and having a gear 34 thereon in mesh with teeth on the periphery of the turntable 27. Along the top edge of the turntable is provided a plurality of notches or cams 35 (FIG. 3) into which a rider 36 attached to a microswitch 37 rides for indexing the table. The microswitch is connected with the motor 32 for activation of the motor turning the turntable from notch to notch. The microswitch 37 has an override remote switch, not shown, for permitting an operator to actuate the motor and permit the rider to pass one of the notches 35 so that the turntable will move to the next notch 35 where the rider on the microswitch engages the notch and turns off the motor stopping the table at the particular predetermined point. Mounted on the turntable is a plurality of upright rotary shafts 45 each spacedly mounted in bearings 46 on the table and having a portion extending through the table to a pulley 47 therebelow. Mounted on each of the shafts is a model, for example, models number 48a, 48b, 48c, etc., which are sized and modeled after the planets of the solar system, astroids, or any type of satellite desired by the operator. The upright shafts on the turntable remain stationary except when indexed in the position for projection, at which point the pulley 47 on that shaft comes into contact with an endless belt 48 mounted on sprocket 49 at one end and drive sprocket 50 at the opposite end. The drive sprocket 50 is driven by a gear 51 mounted on a shaft from motor 54 mounted underneath the platform 25. The table 27 is indexed by overriding the microswitch 37 to move the table to the next succeeding notch or cam 35, which indexes the next succeeding shaft 45 into a position for projecting an image through a projector shown in general by numeral 35. A tubular, black velvet backdrop 54 is mounted on the shaft 30 and rotates therewith providing a black background behind the object in view of the projector lens system 55.

The projector lens system includes a mirror which projects the image of object stationed in front of the lens system and a mirror which is arranged to move the image from the horizon in the planetarium to a spot beyond the zenith thereof. The projector includes a stationary tube 56 supporting a lens system for the projection, which lens system is not shown as such systems are conventional, and a rotary tube 57 mounted in a bearing set 58 and covering a portion of the stationary tube. The outer end of the tube 57 is bifurcated forming a yoke 59 which supports a mirror 60. The tube 57 is turned by means of an electric motor 64 having a gear 65 mounted on its shaft 66 in position to engage the teeth on a large gear 67 secured to the tube 57. Since the normal function of this projector is to provide an image moving from the horizon to a position slightly past the zenith, the motor for turning the tube and the supported mirror 60 is only used for a portion of the time, and a solenoid 70 is arranged to swing the motor 64 on its pivot 68 (FIG. 3) so that the gear 65 is no longer in mesh with the gears on the wheel 67. A weight 72 mounted on gear 67 returns the mirror to its original position which is pointed generally at the horizon of the planetarium. A microswitch 73 limits the movement of the gear 67 and stops the motor 64 when the pin 74 on the gear 67 actuates the microswitch 73 holding the image at the stop position. When the solenoid 70 is actuated, it pulls the gear 65 away from the gear 67 so that the weight 72 returns the tube 67 to its original position. On release of the solenoid the motor swings back, under the influence of a return spring 75, into engagement with the gear 67 and then the motor 64 is again activated by the operator overriding the microswitch 73 to start the rotation of the tube 57. This starts the movement of the image projected through the lens system in tube 56 and the mirror 60 across the planetarium dome.

A lamp 80 is arranged to illuminate the particular model in front of the lens system 56 through a condensing lens system 81 which focuses the light on the model. The intensity of the light is controlled by means of a variac or transformer, not shown, as it is standard equipment in a planetarium.

In the use of the projector of the invention, the projector is set up in the middle, or other desired location, of the planetarium in position to project an image from the horizon at least to about the zenith. The projector box is normally placed in a horizontal position and the mirror 60 is adjusted to project the image at the horizon at a particular place in the planetarium. The initial position of the image, by means of the mirror and the rotation of the tube 57, is preset and the pin 74 is set on the gear 67 so that it will stop the motor 64 at a predetermined position, usually just passed the zenith of the planetarium. The first model which is to be projected by its image on the planetarium is indexed in front of the tube 56. The operator then may actuate the device by turning on the lamp 80 by means of the variable transformer or variac and releasing the solenoid 70 to start the rotation of the tube 57 and its supported mirror 60. Rotation of the tube turns the mirror 60 so that the projected image moves from the horizon up towards the zenith of the planetarium dome. The image is thus caused to move across the sky one at a time. The motor 54 is initially actuated and it runs the belt at all times so that each model moved into projecting position rotates while in that position. The image on the dome appears to be turning on its axis, if it is a planet, astroid or the like. The shafts supporting the planet models should be colored flat black so that they do not project along with the model. When the image reaches the point somewhat passed the zenith it automatically stops by the pin actuating the microswitch 73, which turns off the motor 64 and the image remains in one place turning on its axis. The image of the model remains in that spot until the operator fades it out with the variac and then by means of a switch rotates the turntable to index the next object in front of the projector lens system. As pointed out above a remote control switch actuates the motor 32 by overriding the microswitch which starts the turntable moving to index the next model and is placed, and when the microswitch follower arm moves into the notch or cam 35 and the turntable stops. One very effective display is to show a hypothetical trip through the solar system starting from the earth and moving past the various planets one by one. The models of the planets are mounted in the sequence desired on shafts on the turntable. By painting each of the models as a replica of a planet a very realistic result is achieved, since the opaque projection produces, in effect, an image which is rotating on its axis and thus permits the viewing audience to see all sides of the model. The top portion of the shaft may be bent adding still another movement.

While the invention has been llustrated with reference to a particular embodiment there is no intent to limit the spirit or scope of the invention to the precise details so set forth except as defined in the following claims.

I claim:

1. A planetarium, opaque-image projector for the individual, sequential showing of multiple objects, comprising
   (a) frame means,
   (b) a rotary table mounted on said frame including motor means for rotating said table,
   (c) stop means for automatically stopping said table in a plurality of predetermined positions,
   (d) a plurality of rotary shafts spacedly mounted generally upright on said table,
   (e) a model mounted on each of said shafts and arranged to rotate therewith,
   (f) means for rotating one of said shafts when it is in a preselected position,
   (g) a projector lens system positioned to project an opaque image of a model on said rotating shaft, including means for projecting said image on the dome of said planetarium,
   (h) means for moving said projected image across said planetarium dome in a predetermined path from a start position to a stop position,
   (i) means for illuminating said rotating object,
   (j) means for activating said motor means rotating said table from one said stop position to permit said table to move to the next adjacent stop position, and
   (k) means for moving said means for moving said image from said stop position to said start position.

2. A planetarium, opaque-image projector according to claim 1 wherein said rotary table is generally horizontal.

3. A planetarium, opaque-image projector according to claim 2 wherein said projector lens system is mounted in a horizontal tube, and said means for moving said projected image is a rotatable mirror.

4. A planetarium, opaque-image projector according to claim 1 wherein said stop means includes switch means cooperative with switch contact means on said table for stopping said table at said predetermined positions.

5. A planetarium, opaque-image projector according to claim 1 wherein a belt pulley is mounted on each of said rotary shafts and said means for rotating one of said shafts includes a rotating belt mounted adjacent said projector lens system and arranged to contact the belt pulley on said one shaft.

6. A planetarium, opaque-image projector according to claim 1 wherein said projector lens system includes a stationary tube for the projection lenses, and a rotary tube concentric therewith, and said means for moving said projected image is a mirror affixed to said rotary tube.

7. A planetarium, opaque-image projector according to claim 6 wherein said means for moving said projected image includes electric motor means for rotating said rotary tube.

8. A plenetarium, opaque-image projector according to claim 7 wherein a limit switch is provided which permits said tube to rotate a portion of a revolution.

9. A planetarium, opaque-image projector according to claim 8 wherein said means for moving said means for moving said image includes a motor having a shaft gear movable into and out of engagement with a gear mounted on said rotatable tube, and said means for moving said rotary tube from said stop to said start position is a weight rotating said tube when said shaft mounted gear is out of contact with said tube mounted gear.

10. A planetarium, opaque-image projector according to claim 1 wherein said frame is a hollow receptacle, and said rotary table and projector lens system are mounted internally of said receptacle with said means for projecting said image on the dome extending from said receptacle.

References Cited

UNITED STATES PATENTS

| | | | |
|---|---|---|---|
| 1,711,909 | 5/1929 | Stalcup | 353—65 |
| 2,418,718 | 4/1947 | Maginley | 35—45 |
| 3,266,176 | 8/1966 | Waldrop | 35—45X |

FOREIGN PATENTS 16,238   1934   Australia.

WILLIAM H. GRIER, Primary Examiner

U.S. Cl. X.R.

35—45; 353—66